United States Patent [19]
Dingfelder

[11] Patent Number: 5,735,937
[45] Date of Patent: Apr. 7, 1998

[54] METHOD FOR REMOVING CONTAMINANTS FROM A GAS STREAM

[76] Inventor: Alan W. Dingfelder, 3582 Williams Rd., North East, Pa. 16428

[21] Appl. No.: 649,859

[22] Filed: May 9, 1996

Related U.S. Application Data

[62] Division of Ser. No. 394,708, Feb. 27, 1995, Pat. No. 5,554,209.
[51] Int. Cl.⁶ .................................................. B03C 1/02
[52] U.S. Cl. ........................ 95/28; 55/457; 95/31; 95/269; 96/1
[58] Field of Search .................... 96/1–3; 95/28, 95/269, 27, 31, 34, 272; 55/456, 457, 394, 399

[56] References Cited

U.S. PATENT DOCUMENTS

| | | | |
|---|---|---|---|
| 4,238,183 | 12/1980 | Robinson | 95/28 X |
| 4,357,237 | 11/1982 | Sanderson | 96/1 X |
| 4,629,481 | 12/1986 | Echols | 55/457 X |
| 4,731,186 | 3/1988 | Belasco | 96/1 X |
| 5,108,472 | 4/1992 | Murray, Sr. | 55/337 X |
| 5,271,834 | 12/1993 | Mondiny | 96/1 X |
| 5,554,209 | 9/1996 | Dingfelder | 96/1 |

FOREIGN PATENT DOCUMENTS 257397  11/1969  U.S.S.R. ........................ 95/28

*Primary Examiner*—Richard L. Chiesa

[57] ABSTRACT

A gas contaminant separator includes a pressure tube and a concentric and axially aligned down pipe mounted within the pressure tube. The pressure tube and down pipe define an annular space having a helical rib extending therein. A plurality of magnets are mounted to the down pipe above the helical rib adjacent a perforated plate. A spiral induction plate is mounted within the down pipe for imparting rotation on a gas stream after the gas stream moves through the magnetic field created by the magnets, and through the perforated plate. A gas inlet admits gas into the annular space, and a gas outlet removes gas from the down pipe after it has passed through the annular space, across the magnetic field, through the perforated plate, and through the spiral induction plate mounted in the down pipe. A method for removing contaminants from a gas stream is also provided which method includes directing a gas stream over a helical rib within an annular space separating the gas stream into a plurality of convergent and subsequently divergent flow streams, while simultaneously passing the gas stream through a magnetic field. The gas stream is then passed through a spiral induction plate for imparting rotation to the gas stream such that further contaminants are removed from the gas stream.

5 Claims, 3 Drawing Sheets

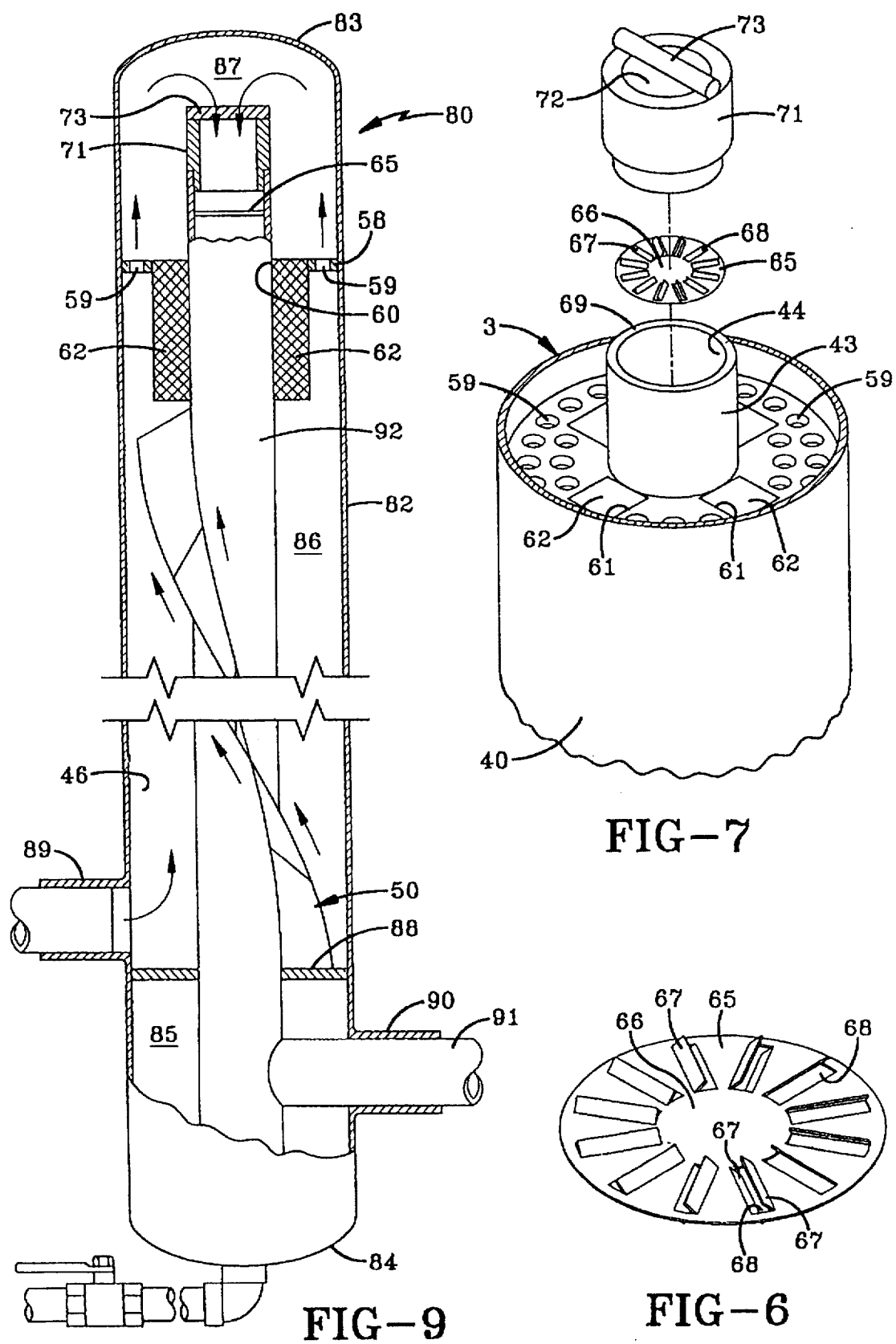

METHOD FOR REMOVING CONTAMINANTS FROM A GAS STREAM

This application is a divisional application of patent application Ser. No. 08/394,708, which was filed on Feb. 27, 1995, and is now U.S. Pat. No. 5,554,209.

BACKGROUND OF THE INVENTION

1. Technical Field

The invention relates generally to a device for removing moisture and other contaminants from a gaseous stream. More particularly, the invention relates to a gas contaminant separator which is placed directly in the gaseous stream to remove moisture and other contaminants therefrom. Specifically, the invention relates to a gas contaminant separator which forces the gas stream along a circuitous route, while varying the gas pressure and velocity by passing the gas stream through a plurality of converging, and subsequently diverging fluid paths while acting upon the gas stream with a magnetic field.

2. Background Information

Devices for removing moisture and other contaminants from a gas stream have been known for some time. As power generation plants become increasingly environmentally conscious, the popularity of gas contaminant separators also increases. Specifically, moisture laden gases such as natural gas or methane are not as combustible and thus are less economical to burn for power generation. Additionally, other contaminants, such as brine, crude oil and distillates which are normally contained in minor amounts along with the gas emitted from a natural gas well, will off-gas toxins when the gas stream is combusted for power generation or industrial purposes further increasing environmental risks. Alternatively, if the off-gas by-products of combusted natural gas, or other gas, is collected for reprocessing, such reprocessing substantially increases the costs of operating the power generation plant. The combustion of pure gas streams, absent contaminants such as moisture and crude oil, thus creates the most environmentally and financially responsible combustible gas stream.

Additionally, alternative gas streams such as hydrogen and helium which are often utilized in industrial environment, are best utilized when the gas stream remains substantially pure. Contaminants in the gas stream not only create an environmental or safety hazard, but may also substantially reduce the effectiveness of many gases when utilized in industrial environments thus substantially increasing operating and production costs associated therewith.

While gas contaminant separators have been utilized in the past, and are presumably adequate for the purpose for which they are intended, conventional gas contaminant separators are based on gravity separation of minor amounts of liquid contaminants from the gas stream. Such contaminants cannot be permitted to flow into gas distribution systems, either in power generation, residential natural gas distribution systems, or industrial systems where they can cause pluggage and reduce gas flow. Such prior separators have been rather massive in dimension having substantial weight requirements to withstand the pressure of the emitting gas. Such equipment has commonly required cranes or front end loaders for their positioning adjacent to gas storage facilities or natural gas wells as well as being less efficient and more costly to manufacture. In such gravity type separators, the theory of operation has basically involved the creation of small droplets of liquid on broad surfaces of packing material with the effect of gravity being relied upon for separation of the liquid droplets from the gas stream. Such separators have previously encountered problems of pluggage where ceramic type packing material has been employed which permit deposition of materials from water and brine on the packing, for example, when removed from a gas stream, such as natural gas, over substantial time periods. The previous occurrence of such pluggage has increased the cost of natural gas wells, and industrial gas distribution system maintenance and reduced the free flow of gas requiring more frequent shut downs for maintenance and replacement of separator components such as the common packing materials.

In order to substantially reduce the size of the gas contaminant separator, it is believed that by varying the pressure and velocity of the gas stream while simultaneously passing the gas stream through a magnetic field, the contaminants, including moisture, will precipitate out of the gas stream. Specifically, it is believed that passing the gas stream through a perforated plate thus creating a converging flow stream and a subsequently diverging flow stream will align long chain molecules as the gas stream moves through the plate perforations at high velocity. Moreover, passing the gas stream across a magnetic field will cause polar molecules to align. While many molecules include a polar constituent, many contaminants, including water molecules, are strongly polar such that these molecules will tend to align along flux lines of the magnetic field more dramatically than the remaining molecules of the gas stream, such as natural gas. The long chain molecules thus align both because the gas stream passes through a perforated plate, and also because the gas stream passes across the magnetic field.

As the gas stream converges to pass through holes in the perforated plate, it is believed that the conservation of angular momentum will cause the gas stream to spin faster as linear velocity increases, and pressure falls. Inasmuch as conservation of angular momentum causes increased spin during converging flow, if a spin were imparted to the flow, the conservation of angular momentum would cause heavier long chain molecules, including contaminants and water to move to the center of the spinning fluid, and thus precipitate out creating a cleaner gas stream. The prior art gas contaminant separators did not utilize the conservation of angular momentum in the fluid stream, and did not operate to pass the stream through a magnetic field.

Therefore, the need exists for a gas contaminant separator which includes a minimal number of moving parts, while simultaneously assuring that contaminants, including moisture, are separated from a gas stream, such as natural gas.

SUMMARY OF THE INVENTION

Objectives of the invention include providing an improved gas contaminant separator for cleaning gaseous streams of contaminants and water vapor constituents which normally occur in minor amounts depending upon the characteristics of the gas stream, and the generating source thereof.

Another objective of the invention is to provide a low cost economical gas/contaminant separator which can be readily installed by a single person due to its lightweight character and minimal size for long term automatic separation of contaminants from a gas stream.

A further objective of the invention is to provide a gas contaminant separator which utilizes no moving parts for separating contaminants from a gaseous stream.

3

A still further objective is to provide such a gas contaminant separator which aligns long chain molecules by separating the gaseous stream into a plurality of convergent fluid streams, and subsequently divergent fluid streams thereby substantially increasing the velocity of the gaseous stream.

Yet another objective is to provide a gas contaminant separator whereby the gaseous stream passes across a magnetic field to align polarized molecules for later separation.

Another objective is to provide a gas contaminant separator which imparts spin to the gas stream such that conservation of angular momentum will assure that heavier contaminants will gravitate toward the center of the spinning gas stream and precipitate out of the gas stream.

A still further objective is to provide such a gas contaminant separator whereby aligned long chain molecules alter phase, and thus release heat, and whereby further heat is released by the altering of the polar constituents in the gaseous stream.

A further objective is to provide a gas contaminant separator which is of simple construction, which achieves the stated objectives in a simple, effective and inexpensive manner, and which solves problems and satisfies needs existing in the art.

These and other objectives and advantages of the invention are obtained by the improved gas contaminant separator, the general nature of which may be stated as including a pressure tube formed with a lower separator section and an upper section; a plate formed with a plurality of holes mounted within the pressure tube and extending intermediate the lower separator section, and the upper section; inlet means for admitting a contaminated gas stream into the separator section; outlet means for releasing a gas stream from the gas contaminant separator; a down pipe; a gas transfer means for transferring the gas stream from the pressure tube to the down pipe whereby said down pipe communicates with the gas transfer means and the outlet means; and magnetic field inducing means for creating a magnetic field within at least one of the pressure tube and down pipe whereby the gas stream must pass through said magnetic field.

BRIEF DESCRIPTION OF THE DRAWINGS

Preferred embodiments of the invention, illustrative of the best mode in which applicant has contemplated applying the principles, are set forth in the following description and are shown in the drawings and are particularly and distinctly pointed out and set forth in the appended claims.

FIG. 6 is an enlarged perspective view of the spiral induction plate of the present invention;

FIG. 7 is an enlarged exploded perspective view, with portions cut away and in section, of the gas contaminant separator shown in FIG. 2;

4

Figure 8:
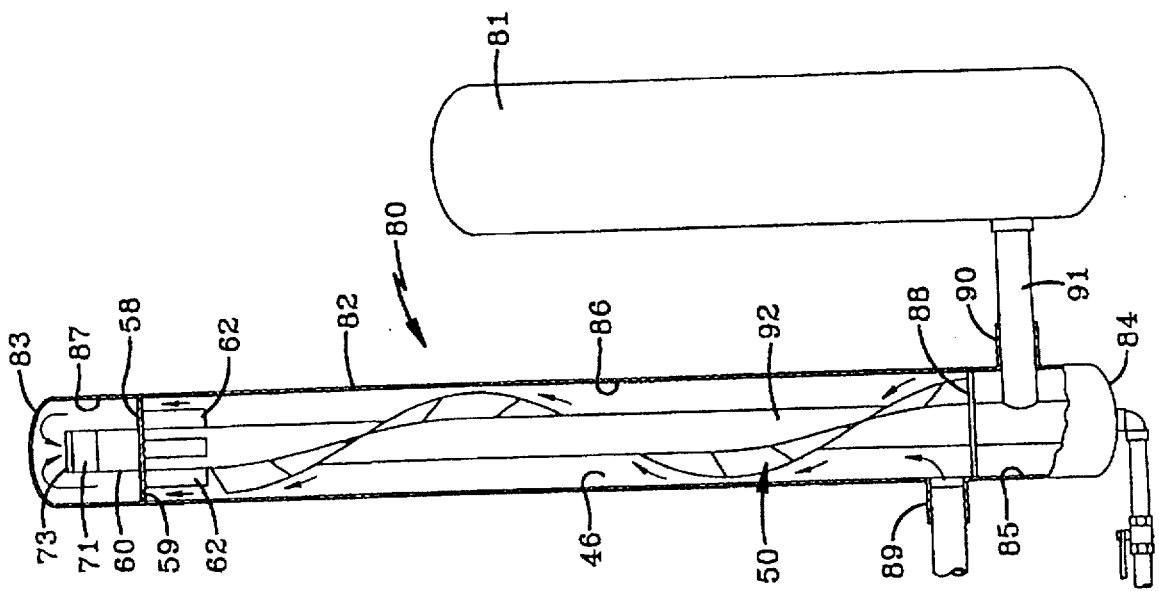
FIG. 8 is a side elevational view of a second embodiment of the present invention, with portions broken away and in section, and shown attached to a brine tank.

FIG. 9 is an enlarged view of the gas contaminant separator shown in FIG. 8, with portions broken away and in section.

Similar numerals refer to similar parts throughout the drawings.

DESCRIPTION OF THE PREFERRED EMBODIMENTS

Figure 1:
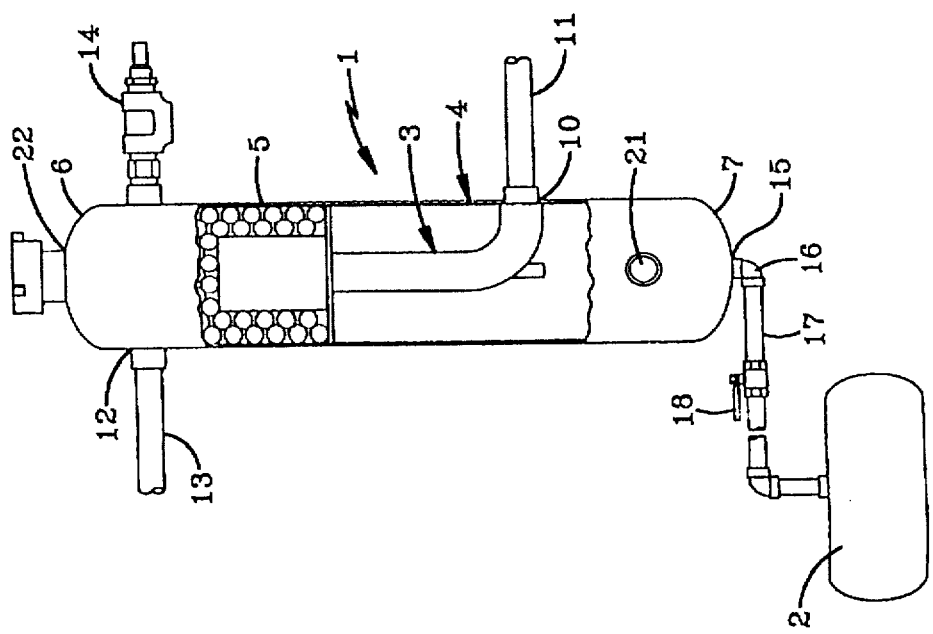
FIG. 1 is a side elevational view of the gas contaminant separator with portions cut away and in section, and shown attached to a brine tank.

A first embodiment of the improved gas contaminant separator of the present invention is indicated generally at 1 in FIG. 1, and is shown in operative association with a brine tank 2. Gas contaminant separator 1 includes a separator gun indicated generally at 3, and a pressure vessel 4. Pressure vessel 4 is generally made of heavy gauge steel in the range of from ¼" to ¾" thick, and is formed with a central tubular portion 5, an semi-spherical bulbous top head 6, and a semi-spherical bulbous bottom head 7. Cylindrical portion 5 is formed with a gas inlet 10 connected to a gas inlet pipe 11, and a gas outlet 12 connected to a gas outlet pipe 13. Additionally, cylindrical portion 5 operatively communicates with a relief valve 14. Should pressure inside pressure vessel 4 increase beyond a predetermined limit, relief valve 14 will vent excess pressure for safety purposes. A liquid drain 15 is located centrally in bottom head 7 of pressure vessel 4 connected to an elbow 16 leading to a discharge pipe 17. Discharge pipe 17 is connected to brine tank 2, and is operatively associated with a discharge valve 18.

Discharge valve 18 may be operated manually such that periodically service personnel will open valve 18 to discharge liquids collected within pressure vessel 4 and drain them into brine tank 2 for later collection. Alternatively, discharge valve 18 may be motorized and operatively associated with a float control 21 whereby motorized discharge valve 18 and float control 21 are either electronically or mechanically connected such that when float control 21 rises to a predetermined level, a switch is actuated which operates motorized discharge valve 18. Float control 21 may come in a variety of forms such as the type shown and described in U.S. Pat. No. 5,108,472, the contents of which are incorporated herein by reference, with one type of automatic level float control being Kimray, Product No. 860 HUTA, made and sold by Kimray Products Co. Float control 21 serves to periodically discharge accumulations of liquid which are collected in bottom head 7 of pressure vessel 4.

Figure 2:
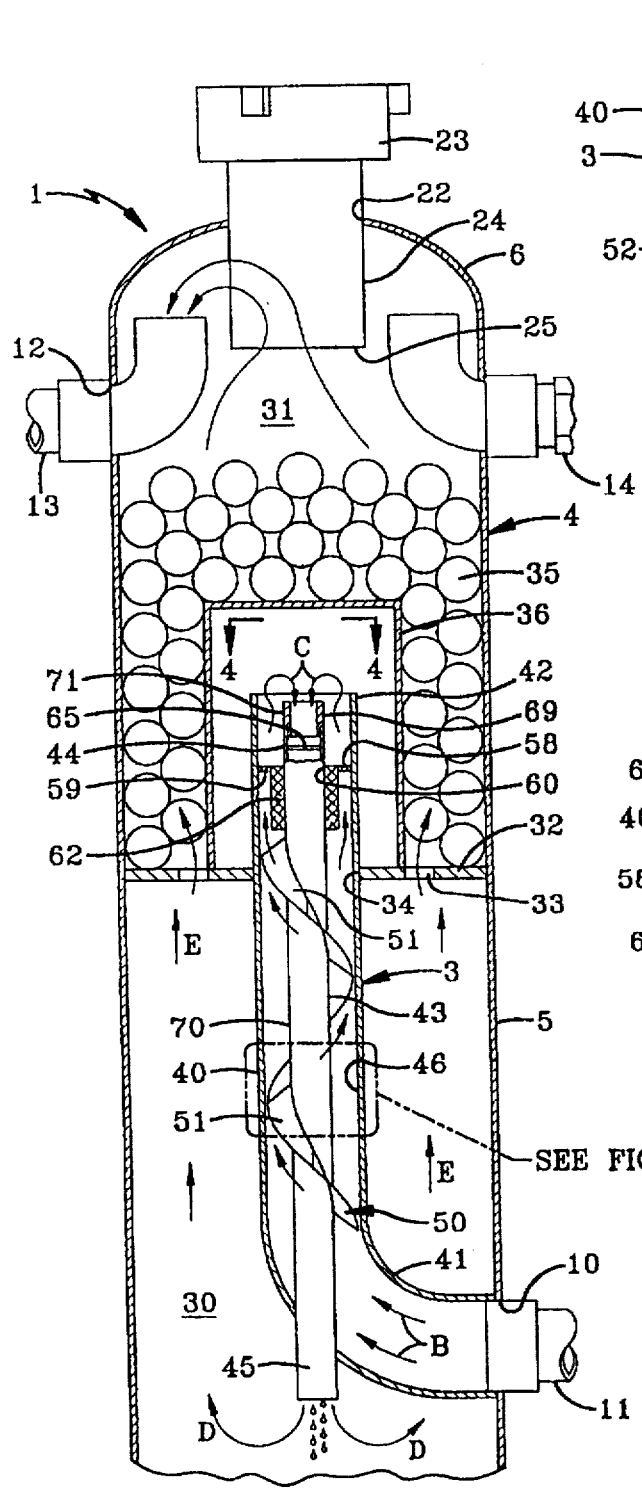
FIG. 2 is an enlarged side elevational view of the gas contaminant separator shown in FIG. 1, with portions cut away and in section.

Referring to FIG. 2, a desiccant material inlet opening 22 is formed in top head 6 of pressure vessel 4, and is closed by a hammer union closure 23. A tube 24 is mounted on closure 23 and extends a predetermined distance into pressure vessel 4 with its bottom end opening 25 being located beneath the opening of gas outlet pipe 13.

Pressure vessel 4 includes a lower separator section 30 and an upper dryer section 31. Lower separator section 30 and upper dryer section 31 are separated by a perforated support plate 32 which is formed with a plurality of holes 33 and a central opening 34. Perforated support plate 32 supports a bed of desiccant material 35 which will usually be in pellet form. The preferred desiccant 35 used in gas contaminant separator 1 is manufactured by Clear Water, Inc. of Pittsburgh, Pa., and distributed under its trademark Xentrite NGV. This particular type of desiccant has been found preferable, although other types of desiccants could be used without materially affecting the concept and advantages of the invention. Additionally, a gas transfer box 36 is positioned over central opening 34, and inwardly of holes 33. Gas transfer box 36 is preferably welded to perforated support plate 32 such that desiccant material 35 is positioned on top of transfer box 36 and in the annular space extending between gas transfer box 36 and pressure vessel 4.

In accordance with one of the main features of the present invention, separator gun 3 (FIG. 2) includes a pressure tube 40 mounted within central opening 34 which pressure tube has an outer diameter substantially equal to central opening 34. Pressure tube 40 may be mounted in central opening 34 by any convenient attachment means, but preferably tube 40 is welded to perforated support plate 32 about central opening 34. Pressure tube 40 includes an elbow portion 41 attached to gas inlet 10, and an open end 42 operatively communicating with gas transfer box 36. A vertical down pipe 43 is axially aligned with pressure tube 40, and extends downwardly therethrough. Down pipe 43 includes an upper end 44 which opens into gas transfer box 36 below open end 42 of pressure tube 40. Down pipe 43 also includes a lower end 45 which extends through the sidewall of elbow 41 and opens into lower separator section 30 of pressure vessel 4. Preferably a hole is formed in pressure tube 40 adjacent elbow 41 to allow down pipe 43 to extend therethrough. Pressure tube 40 and down pipe 43 define an annular cavity 46 therebetween which extends along the length of down pipe 43 between open end 42 and elbow 41.

Figure 3:
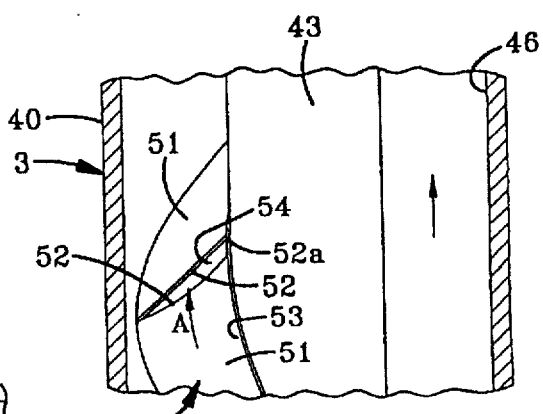
FIG. 3 is an enlarged fragmentary view of the encircled portion shown on FIG. 2, with portions shown in section.

In further accordance with one of the main features of the present invention, helical rib 50 extends around down pipe 43 within annular cavity 46. Helical rib 50 is welded to the exterior surface of down pipe 43 and is formed with between 1 and 3 rotations, and in the preferred embodiment is formed with approximately 1½ rotations around down pipe 43. Referring to FIGS. 2 and 3, helical rib 50 is formed from a plurality of arcuate metal plates 51. Each arcuate plate 51 includes a pair of spaced apart ends 52 with each end 52 having a corner 52a, and a pair of spaced apart sides 53. One side 53 is welded to down pipe 43, with ends 52 of adjacent metal plates 51 also being welded at corners 52a. Ends 52 of adjacent metal plates 51 thus define a space 54 therebetween. Space 54 permits a portion of the gas stream flowing in the direction of arrow A to pass therethrough.

Figure 4:
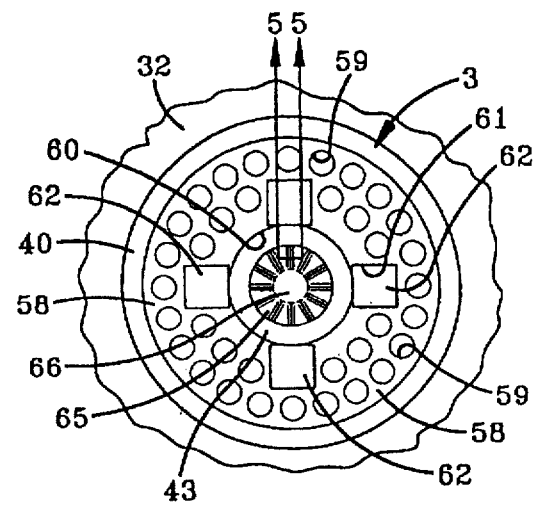
FIG. 4 is an enlarged fragmentary top view taken along line 4—4, FIG. 2.

A perforated plate 58 is also positioned in annular cavity 46 intermediate down pipe 43 and pressure tube 40 (FIGS. 2 and 4). Perforated plate 58 is formed with a plurality of holes 59 to permit passage of gas therethrough, and a central opening 50 for receiving down pipe 43. Perforated plate 58 is preferably positioned above helical rib 60, and above perforated support plate 32. Perforated plate 58 is also formed with a plurality of square holes 61 for receiving bar magnets 62, the purpose for which will be described in detail below. It is noted, that bar magnets include a positive and negative pole, with one of the positive and negative poles being positioned along the length of bar magnets 62 adjacent down pipe 43, and the other being positioned on an opposing surface of bar magnets 62 adjacent pressure tube 40 whereby the flux lines of the magnetic field created by bar magnets 62 are substantially perpendicular to the flow direction of the gas stream. However, it should be understood that bar magnets 62 could be so positioned so that the flux lines of the magnetic field created thereby are positioned parallel to the direction of flow of the gas stream without departing from the spirit of the present invention. However, it is believed that positioning bar magnets 62 such that the flux lines are perpendicular to the direction of flow will enhance the effect of the magnetic field on the gas stream as described in more detail below.

Figure 5:
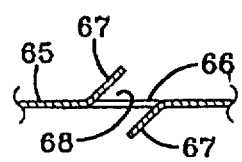
FIG. 5 is an enlarged sectional view taken along line 5—5, FIG. 4.

A spiral induction plate 65, formed with a circular central plate 66, is positioned within down pipe 43 (FIGS. 4–7). A plurality of pairs of outwardly extending alternating upwardly and downwardly extending flaps 67 extend radially outwardly from central plate 66 toward down pipe 43 (FIG. 5). Each pair of flaps 67 define a rectangular opening 68 therebetween. Rectangular openings 68 admit the gas stream into down pipe 43, and impart a spin upon the gas stream as it passes into down pipe 43 as is described in more detail below. Spiral induction plate 65 separates down pipe 43 into an upper section 69 and a lower section 70. Upper end 44 of down pipe 43 receives a collar 71 for varying the length of upper section 69 of down pipe 43. Additionally, collar 71 includes an open end 72, and a bar 73, preferably ¼" in diameter, extends across opening 72 of collar 71.

In accordance with the invention, the method of removing contaminants from the gas stream includes the first step of receiving a gas stream through gas inlet 10 and moving the gas stream in the direction depicted by arrows B into annular cavity 46. As the gas stream moves into annular cavity 46, helical rib 50 imparts rotation on the gas stream. As the gas stream rotates, conservation of angular momentum causes heavier contaminated particles, including water vapor, to move toward the center and collect along the exterior surface of down pipe 43 thus initially removing heavy contaminants from the gas stream. As the gas stream continues to move through annular cavity 46, the stream will pass through holes 59 formed in perforated plate 58. It is believed that holes 59 provide a plurality of separate gas streams with each gas stream converging to pass through a hole 59 and subsequently diverging as it enters gas transfer box 36. The velocity of the separated gas streams increases as the stream converges to pass through holes 59. It is believed that as the gas stream converges, long chain molecules will align along the direction of flow. Additionally, it is believed that when the gas stream is passed through a magnetic field such as that created by bar magnets 62, polar molecules will be stressed differentially from non-polar molecules. In the example of natural gas containing principally methane, ethane, propane and butane together with contaminants such as water vapor, the contaminants, including water vapor, being significantly more polar than the remaining gases, will tend to axially align along the flux lines of the magnetic field created by bar magnets 62.

The magnetic field created by bar magnets 62 will cause long chain molecules to align along the flux lines created by the magnetic field at the same time that the gas stream converges further causing long chain molecules to axially align. It is believed that the orienting affect of the magnetic fields, in combination with the orienting affect of moving a gas stream at high velocity through a convergent flow zone, will strip water molecules from the hydrocarbons whereby the water molecules and other contaminants rapidly link up into long chains such that the chains cross link to form contaminant solids. As should be apparent from a review of FIG. 2, and the above discussion, as the contaminants, including water vapor are moved from a gaseous state to a solid state, heat will be given off such that the remaining gas is heated, and the partial pressure of the water vapor is raised.

Contaminants are removed from the gas stream via the execution of the above method by passing the gas stream through helical rib 50, with additional contaminants being removed from the gas stream via the streams passage through a converging flow zone in combination with the streams passage through a magnetic field. In the divergent flow zone, down stream from the above described convergent flow zone, turbulent flow creates significant vortices which may themselves contain their own magnetic field due to strong fluid rotation at the vortex. Again, conservation of angular momentum will cause heavier contaminants, including the cross linked solids formed in the magnetic field, to move to the center of these vortices as the gas flow enters gas transfer box 36.

Inasmuch as down pipe 43 opens into separator section 30 at its lower end 45, the pressure within down pipe 43 is somewhat lower than that in gas transfer box 36. This lower pressure will thus cause the gas within gas transfer box 36 to move in the direction shown by arrows C. As the gas stream enters upper section 69 of down pipe 43, it will pass over collar 71, and into rectangular openings 68. Flaps 67 on either side of rectangular opening 68 of spiral induction plate 65 will once again impart rotation onto the gas stream such that the high velocity gas will rotate as it travels within down pipe 43. Once again, conservation of the angular momentum will cause heavier particles to gravitate towards the center of the gas stream as the gas stream rotates. As contaminants, including the cross link solids formed in the magnetic fields described hereinabove, move toward the center of the gas stream, they will fall out of the rotating fluid and into bottom head 7 for removal through discharge pipe 17. The gas stream exiting down pipe 43 along the direction of arrow D will rise upwardly as indicated by arrows E, and through holes 33 of perforated support plate 32 into dryer section 31 of pressure vessel 4. As the gas stream enters dryer section 31, the majority of contaminants and moisture have been removed from the gas stream, with desiccant material 35 removing any remaining moisture. The gas stream entering gas outlet 12 is thus substantially free from contaminants and water vapor.

As is apparent from a review of FIGS. 1–7, substantially all the contaminants and water vapor in the gas stream are removed without passing the gas stream through any moving parts substantially reducing operation costs, and increasing the life span of the gas contaminant separator.

In accordance with a second embodiment of the present invention, the gas contaminant separator is shown generally in FIGS. 8 and 9, and is indicated generally at 80. Gas contaminant separator 80 is substantially identical to gas contaminant separator 1, except it does not include a pressure vessel 4 with included desiccant 35. In the second embodiment of the invention, gas contaminant separator 80 is attached to a pressure vessel 81 with desiccant material included therein. Given the similarity between the first embodiment and the second embodiment of the present invention, the second embodiment will be described only to the extent that it differs from the first embodiment of the invention. Gas contaminant separator 80 includes a pressure tube 82 closed on its top with a semi-spherical bulbous top head 83, and closed on its bottom with a semi-spherical bulbous bottom head 84. Pressure tube 82 is separated into a lower contaminant reservoir 85, an intermediate separator section 86, and a gas transfer box 87. Separator plate 88 extends between contaminant reservoir 85 and separator section 86. Pressure tube 82 is formed with a gas inlet 89 above separator plate 88 for admitting gas into separator section 86. Similarly, pressure tube 82 is formed with a gas outlet 90 for receiving a gas outlet pipe 91 which extends through pressure tube 82 and operatively connects with down pipe 92 such that gas exiting down pipe 92 is admitted directly into gas outlet pipe 91. Down pipe 92 extends downward beyond gas outlet pipe 91 into contaminant reservoir 85 such that contaminant liquid may be drained substantially as described in the first embodiment of the invention for admitting gas from contaminant reservoir 85.

The remaining portions of gas contaminant separator 80 are identical to gas contaminant separator 1 in that separator 80 includes an annular space 46 extending around down pipe 92 and pressure tube 82, a perforated plate 58 having a plurality of holes 59 and a central opening 60 for receiving down pipe 92 and a plurality of bar magnets 62 mounted adjacent down pipe 92. Still further, gas contaminant separator 80 includes a spiral induction plate 65 within down pipe 92 as well as a helical rib 50 welded to the exterior surface of down pipe 92 and extending along substantially the entire length of intermediate separator section 86. However, gas transfer box 87, while operating identically to gas transfer box 36 in the first embodiment of the invention, is formed from a portion of pressure tube 82 and from upper head 83. Similarly, as the gas stream passes out of down pipe 92 and into contaminant reservoir 85 it will pass directly into interconnected gas outlet 90 and subsequently into pressure vessel 81, rather than passing upwardly along the exterior surface of the pressure tube and into a desiccant material as is included in gas contaminant separator 1.

As is apparent from a review of both the first and second embodiment of the second invention, gas contaminant separators 1 and 80 remove substantially the entire amount of contaminant and water vapor within a gas stream by moving the gas stream along a circuitous route which includes both a convergent and divergent flow zone, as well as by imparting rotation on the gas stream and passing the same through a magnetic field at high velocity. This is accomplished with a minimum of moving parts such that the life span of the gas contaminant separators 1 and 80 are substantially increased relative to prior art gas contaminant separators.

It is further believed that passing the gas stream through spiral induction plate 65 creates an acoustic wave which may be directed to move either upstream or downstream which acoustic wave will create a resonance within the gas stream causing heavier contaminants and water vapor to resinate at an alternate frequency and precipitate out of the gas stream in a drip tank which may also be positioned either upstream or downstream from the gas contaminant separator.

In summary, both gas moisture separators 1 and 80 remove contaminants and water vapor from a gas stream, for example, natural gas, by imparting rotation on the gas stream just prior to passing the gas stream through a converging and subsequently diverging flow zone such that the long chain molecules will align when passing through the converging flow zone at high velocity. Additionally, a magnetic field acts upon the gas stream as the gas stream moves through the convergent flow zone to substantially enhance the alignment of long chain molecules by acting differentially on molecules of varying polarity such that stronger polar molecules, i.e. contaminants and water vapor, will tend to axially align while less polar molecules such as natural gas, tend to remain randomly oriented. Additionally, as the gas stream moves across the magnetic field in the conversion flow zone, long chain molecules will tend to link up, and cross-link creating solid contaminants which are significantly heavier than the remaining gas stream. After the gas stream passes through the magnetic field and convergent flow zone, the gas stream is rotated such that the heavier solid contaminants will precipitate out of the gas stream as a result of the conservation of angular momentum.

Accordingly, the improved gas contaminant separator of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved gas contaminant separator of the present invention is constructed and used, the characteristics of the construction, and the advantageous, new and useful results obtained; the new and useful structures, devices, elements, arrangements, parts and combinations, are set forth in the appended claims.

I claim:

1. A method of removing contaminants from a gas stream comprising the steps of:

admitting a contaminated gas stream into a pressure tube;

passing the gas stream through a convergent flow zone and a subsequently divergent flow zone for partially aligning long chain molecules;

passing the gas stream through a magnetic field to differentially effect polar and non-polar molecules; and admitting the gas stream into a down pipe where long chain molecules will precipitate out of the gas stream.

2. The method as defined in claim 1 in which the magnetic field acts upon the gas stream simultaneously as the gas stream passes through the convergent flow zone.

3. The method as defined in claim 2 comprising the further step of passing the gas stream over a helical rib extending upwardly within the pressure tube for imparting rotation to the gas stream prior to passing the same through the convergent flow zone.

4. The method as defined in claim 3 comprising the further step of imparting rotation on the gas stream after the gas stream passes through the convergent flow zone.

5. The method as defined in claim 2 in which the gas stream is separated, and in which each separate gas stream flows through one of a plurality of separate convergent and subsequent divergent flow zones.

* * * * *